United States Patent
Isadore-Barreca et al.

(10) Patent No.: US 6,205,231 B1
(45) Date of Patent: *Mar. 20, 2001

(54) OBJECT IDENTIFICATION IN A MOVING VIDEO IMAGE

(75) Inventors: Anthony J. Isadore-Barreca, Oakland; David R. Emberson, Santa Cruz; Mark I. Himelstein, Saratoga; Donald E. Meyer, Cupertion, all of CA (US)

(73) Assignee: Identive Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/435,439

(22) Filed: May 10, 1995

(51) Int. Cl.[7] .................................................. G06K 9/00
(52) U.S. Cl. ..................... 382/103; 382/107; 382/190; 382/199
(58) Field of Search .................................. 382/103, 107, 382/199, 313, 316, 173, 190

(56) References Cited

U.S. PATENT DOCUMENTS

| | | | |
|---|---|---|---|
| 5,111,511 | 5/1992 | Ishii et al. ................................. | 382/1 |
| 5,119,439 | * 6/1992 | Osawa et al. ........................ | 382/199 |
| 5,177,794 | 1/1993 | Abe et al. ............................... | 382/48 |
| 5,237,648 | 8/1993 | Mills et al. ............................ | 395/133 |
| 5,243,418 | * 9/1993 | Kuno et al. ........................... | 382/103 |
| 5,301,172 | 4/1994 | Richards et al. ....................... | 369/32 |
| 5,311,305 | 5/1994 | Mahadevan et al. ................ | 348/169 |
| 5,323,470 | 6/1994 | Kara et al. .............................. | 382/1 |
| 5,329,368 | 7/1994 | Plotke ................................... | 348/701 |
| 5,377,319 | 12/1994 | Kitahara et al. ..................... | 395/161 |
| 5,537,155 | 7/1996 | O'Connell et al. .................. | 348/699 |
| 5,590,262 | 12/1996 | Isadore-Barreca ................... | 395/601 |

OTHER PUBLICATIONS

Minas E. Spetsakis, A Linear Algorithm for Point and Line–Based Structure from Motion, Dept. of Computer Science, York University, Ontario, Canada, 1992.

David G. Lowe, Robust Model–Based Motion Tracking through the Integration of Search and Estimation, Int'l Journal of Computer Vision, 8:2, 113–122 (1992).

Spetsakis and Aloimonons, Structure from Motion Using Line Correspondences, Int'l Journal of Computer Vision, 4, 171–183 (1990).

Blake, et al., Affine–Invariant Contour Tracking with Automatic Control of Spatiotemporal Scale, Dept. of Engineering, University of Oxford, UK (1993).

Driche and Faugeras, Tracking Line Segments, Image and Vision Computing, vol. 8, No. 4, Nov. 1990.

Anandan, A Computational Framework and an Algorithm for the Measurement of Visual Motion, Int'l Journal of Computer Vision, 2, 283–310 (1989).

Zhang and Faugeras, Determining Motion from 3D Line Segment Matches: A Comparative Study, Image and Vision Computing, vol. 9, No. 1, Feb. 1991.

(List continued on next page.)

*Primary Examiner*—Matthew Bella
(74) *Attorney, Agent, or Firm*—Gary Cary Ware & Freidenrich

(57) ABSTRACT

A moving object identification method (10) for identifying and tracing an object (20) within a video image (14) such that the object (20) can act as a hot spot (30) as for an interactive computer/user interface (70). A plurality of tags (28) define the edges (26) of the object (20) and a plurality of hot spot borders (32) define the hot spot (30) such that the hot spot (30) and the object (20) generally coincide. A physical tag (28b) is optionally used to position the tags (28). Sensitivity to disappearance of the edges (26) is adjustable according to the relative size of a subtag (68) to the corresponding tag (28).

10 Claims, 5 Drawing Sheets

OTHER PUBLICATIONS

Tan, et al., 3D Structure and Motion Estimation from 2D Image Sequences, Image and Vision Computing, vol. 11, N. 4, May 1993.

Hager, et al., A Framework for Real–Time Window–Based Tracking Using Off–the–Shelf Hardware, Dept. Computer Science, Yale University, RR–988, Oct. 193.

Toyama and Hager, Keeping One's Eye on the Ball: Tracking Occluding Contours of Unfamiliar Objects Without Distraction, Dept. Computer Science, Yale University, RR–1060, Jan. 1995.

Hager and Toyama, X Vision: A Portable Substrate for Real–Time Vision Applications, Dept. Computer Science, Yale University, RR–1078, Jun. 1995.

Hager and Belhumeur, Real–Time Tracking of Image Regions with Changes in Geometry and Illumination, Dept. Computer Science, Yale University.

Toyama and Hager, Incremental Focus of Attention for Robust Visual Tracking, Dept. Computer Science, Yale University, Oct. 1995.

Content Oriented Visual Interface Using Video Icons for Visual Database Systems; Yoshinobu Tonomura and Shinji Abe, NTT Human Interface Laboratories, Nippon Telegraph and Telephone Corporation, Kanagawa, Japan, IEEE, Apr. 1989, pp. 68–73.

* cited by examiner

OBJECT IDENTIFICATION IN A MOVING VIDEO IMAGE

TECHNICAL FIELD

The present invention relates generally to the field of computer video image manipulation, and more particularly to an improved means and method for identifying objects of concern within a video image such that identification of the objects can be maintained even as the objects move within the image.

BACKGROUND ART

Manipulation of digitized video images, both still pictures and moving video presentations, is an important aspect of the present trend toward the introduction of "multimedia" into many aspects of our lives, as well as in modern aspects of more traditional endeavors such as, for example, the creation of motion pictures. A copending U.S. patent application Ser. No. 08/146,964, having an inventor in common with this present invention, teaches a method for converting a conventional "moving picture" video into a computer/user interface means. In accomplishing the method of that previous invention, it is necessary to identify, within the video presentation, particular objects of concern. As discussed in the above referenced disclosure, such identification can be quite laborious, and it was anticipated that methods for transferring some of that labor from the human operator to the computer might be developed in the future.

It was disclosed that the designation of "hot spots", consisting of objects within a moving video, were, ". . . accomplished by viewing each key frame and, at least until a more automated system is developed therefor, manually designating which, if any, objects or items of interest in the key frame are to be designated as the hot spots." (Reference numbers relating to the prior designation have been deleted in this quotation.) This present application is directed to a method and means for automating the identification of such objects and maintaining such identification through time. Although the present inventive method is intended to be used in conjunction with the production of interactive computer interface systems, it is not restricted to such applications.

An object in animated, or other specially prepared moving video images, can be rather easily identified, since such object can be created according to a specific easily distinguishable criterion (such as color, or the like) or, indeed, the pixel location of the object can be made a part of the data which describes the object within the computer even as the object is created. However, objects within a live action video, which video has not been specially produced nor specially prepared, cannot be so easily segregated.

Prior art methods for identifying objects in a video image, such that the object is defined according to computer understandable criteria, have included identifying edges, colors or color patterns and/or brightness levels which define the object. Such methods have been relatively effective for the identification and/or manipulation of still video images. For example, an object can be distinguished by known methods for automatically defining the outer edges thereof, and the object can then be operated upon. As examples of such operations, the object can be moved within the image, removed from the image, or changed in color, luminosity, or the like. More in the context of the present invention, the object could even then, once the image is defined in terms of a bit map, be used in the manner of an icon or a "hot spot", such that clicking on the area of the image within the object could cause the computer to initiate a response or further interaction with the end user. It should be remembered, however, that this sort of procedure does not transfer well into the realm of moving video images. Firstly, keeping track of the location of objects within a moving video image by storing a bit map of all such objects for all frames of the moving image would require a morass of data which would tax a computer's data storage capacity and slow down the operation of the computer. Secondly, although the amount of user interaction and labor required to perform the above described operations is well tolerable when working with a single still video image, an attempt to repeat such an operation thirty or so times for each second of a moving video would quickly reveal that this method is outside the realm of practicality.

One accepted method for separating objects within a moving video image has been based upon the color of portions of the image. One skilled in the art will be familiar with the "blue screen" method wherein portions of an image which are of a specific color (often, but not necessarily, blue) can be selectively removed from an image. This technique was used in television prior to the advent of digital image manipulation, and has been found to work well also when applied to the field of digital image manipulation. While this method works well for its intended purpose, it will generally only successfully distinguish, for example, a background from the foreground object(s). Furthermore, it requires a special setting in that the object(s) of concern must be originally "shot" (meaning photographed, video taped, or the like) against the special background color. Most importantly, although the background is distinguished from the foreground objects such that a computer can calculate the location of the objects in order to perform operations thereon (such as overlaying the objects upon a different background), different objects are usually not sufficiently identifiable in terms usable by the computer such that the objects can serve as means for computer/user interaction. Moreover, even in those special situations in which a video scene can be shot in front of a blue background or the like, and even in those unusual instances wherein there may be only a single object in the foreground such that there will be no confusion between objects, such prior art solutions do not address the problem of extensive data storage requirements and drain on computation resources, as discussed above.

Methods for identification of edges or complex color patterns within a video image are more effective for segregating specific "real world" portions of a video image, as compared to the more artificially induced background "blue screen" methods. However, such edge or color identification methods generally require relatively sophisticated computer analysis, and so are not suitable for real time image tracking, at least unless a great deal of expensive computing power is dedicated to such tracking. Even where a practically unlimited quantity of computer resources are available to the task, attempting to track moving objects within a video image according to such complex criteria has proven to be undesirably complicated. Where more than one object is to be tracked within the video, or where the objects are rapidly moving and/or changing relative shape within the video, the problems associated with such methods are exacerbated.

It has been brought to the inventor's attention that several prominent manufacturers of computer products have a need for a better means and/or method for identifying moving objects within video images such that the objects may be followed by a computer, in order to implement their own products. However, in spite of the fact that some of these companies have extensive research budgets and large and experienced research staffs, they have turned to the present inventor seeking a solution to this known problem.

To the inventor's knowledge, no workable method has existed in the prior art for quickly and easily identifying, for computer tracking and manipulation, objects within moving video images which is inexpensive and easy to implement and reliable. All prior art methods have either been extremely labor intensive and/or have required an inordinate amount of computing power to implement (or, even worse, have required an inordinate amount of computing power for an end user to utilize the product of such methods) and/or have not reliably identified objects such that a computer can track the objects within a video presentation without "losing" the objects or confusing them with the backgrounds or other objects in the video.

DISCLOSURE OF INVENTION

Accordingly, it is an object of the present invention to provide a method for easily identifying objects within a digitized moving video image such that the objects can be tracked by a computer.

It is still another object of the present invention to provide a method for identifying objects within a digitized moving video image which requires a minimum of operator intervention and labor.

It is yet another object of the present invention to provide a method for identifying objects within a digitized moving video image which does not require a great deal of computer power to implement.

It is still another object of the present invention to provide a method for identifying objects within a digitized moving video image which identifies the objects in such a manner that a computer can store the identifying criteria using a minimum amount of data storage resources.

It is yet another object of the present invention to provide a method for identifying objects within a digitized moving video image which will allow a computer to easily follow the object as it moves through the image, without overburdening the computer's resources.

It is still another object of the present invention to provide a method for identifying objects within a digitized moving video image which will allow the objects to serve as gateways for computer/user interaction in the manner of computer icons, and the like.

Briefly, the preferred embodiment of the present invention is an automated method for identifying objects within a digitized moving video image such that a computer can readily identify the objects, without overburdening the computer, even as the objects change shape or move within the video image. The inventive moving object identification method first identifies an object within a single frame of a moving video image. The initial identification can be accomplished using extensive originating user input, or by more automated methods. In a first preferred embodiment of the invention, conventional automated software methods are used for initial object identification. In an equally preferred alternate embodiment of the invention, a unique combination of software and hardware components are used for the initial object identification.

Although the initial object identification, according to the present invention, is accomplished either according to known methods or a new combination of known methods and means, a primary inventive aspect of the present invention is that initial identification is followed by a conversion operation wherein only such data as is necessary to reliably track the object is retained. Therefore, very little recomputing will be required to track the object as the object moves and/or changes shape from frame to frame in the moving video presentation.

Regarding this present invention, it should be understood that computers will play a part both in the inventive method for identifying objects within a video presentation and, also, computers (more than likely, different computers than those used for originally identifying the objects) will be employed to eventually use the end product of the present invention. In this regard, there will be reference hereinafter to "originating user(s)", those being the users who use the present inventive method for creating a computer/user interface, or other appropriate application of the inventive method as will be disclosed herein. References to "end user(s)" will be to those persons who, rather than directly using the present inventive method, will use the computer/user interface means produced by the originating user(s) according to the present inventive method.

An advantage of the present invention is that it does not require an expensive powerful computer to be implemented.

A further advantage of the present invention is that it does not require an expensive powerful computer in order to use the end product of the method.

Still another advantage of the present invention is that it does not require a great deal of user input.

Yet another advantage of the present invention is that it allows a computer to reliably track objects within a digitized moving video, clearly distinguishing the objects from background and other objects such that the objects of interest can be acted upon by a computer and/or by a computer user acting in conjunction with a computer.

These and other objects and advantages of the present invention will become clear to those skilled in the art in view of the description of the best presently known mode of carrying out the invention and the industrial applicability of the preferred embodiments as described herein and as illustrated in the several figures of the drawing.

BEST MODE OF CARRYING OUT THE INVENTION

The best presently known mode for carrying out the invention is a moving object identification method instituted, primarily, through the use of a computer. The predominant expected usage of the inventive moving object identification method is in the making of interactive computer/user interface systems, although the method might be used in essentially any application wherein it is necessary to track an object within a moving video image.

Figure 1:
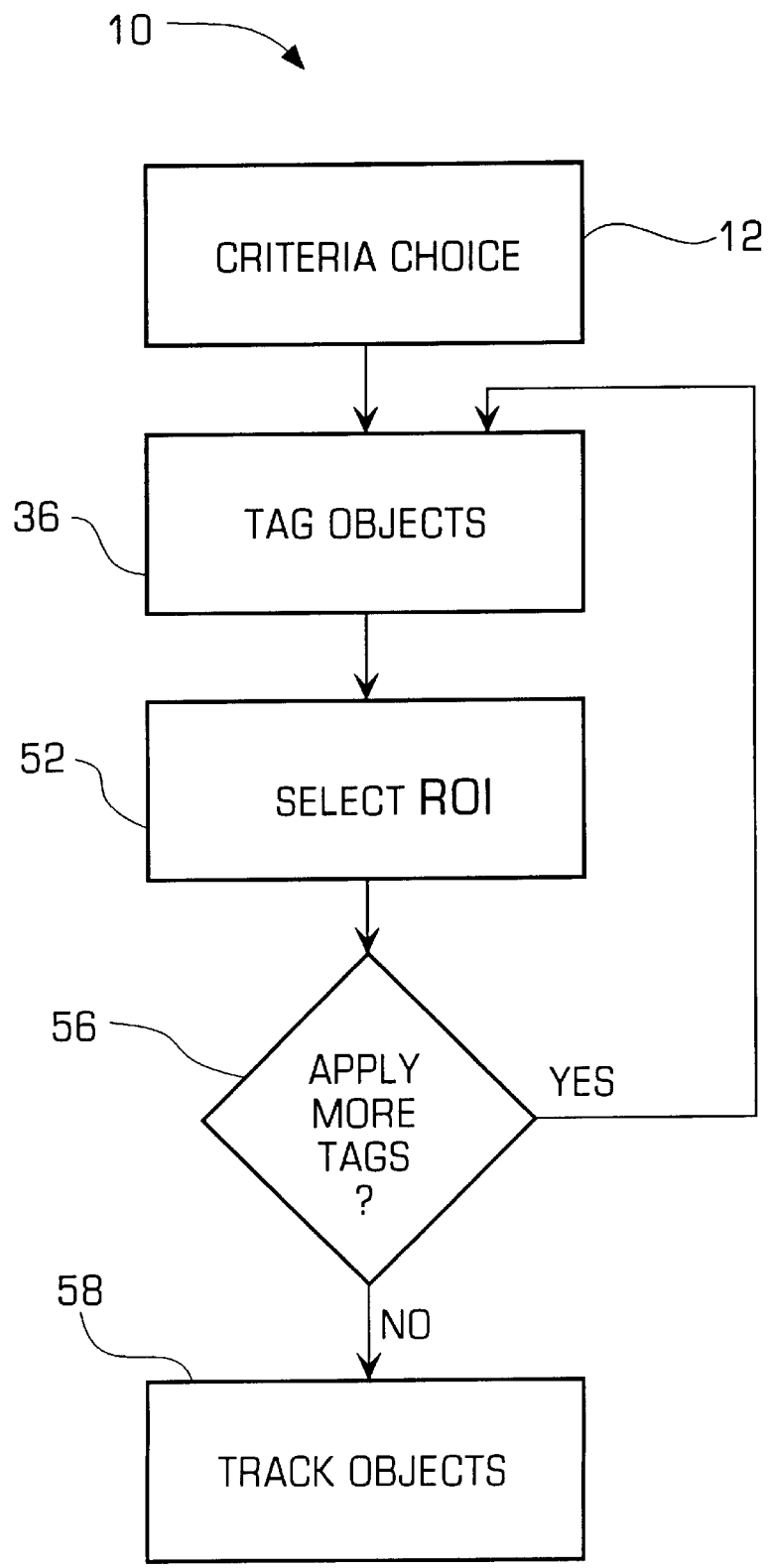
FIG. 1 is a flow chart depicting a moving object identification method according to the present invention.

The inventive moving object identification method is depicted in a flow chart in FIG. 1, and is designated therein by the general reference character 10. A 'criteria choice' operation 12 is the first step of the moving object identification method.

Figure 2:
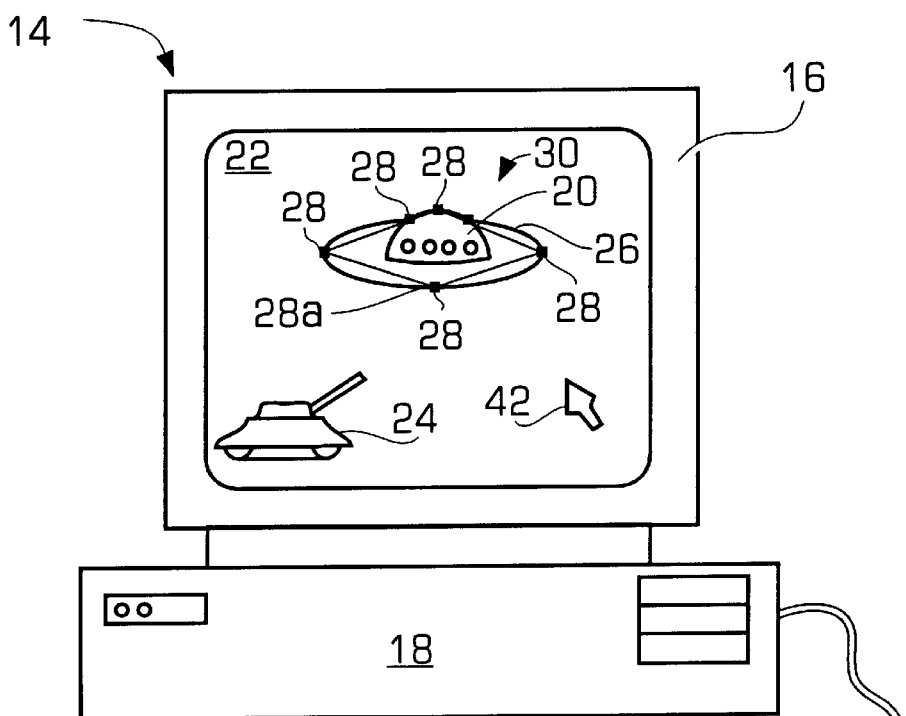
FIG. 2 is a depiction of a video image such as is acted upon according to the present inventive method.

FIG. 2 is a diagrammatic representation of a video image 14 being displayed on a display screen 16 of a computer 18. The video image 14 is a single "frame" of a moving video presentation which has been digitized according to conventional methods such that the video image 14 can be stored in the computer 18 and displayed thereby on the display screen 16. It should be noted that, although one skilled in the art will recognize that there are substantial differences in format between a motion picture film, a television signal and a digitized video presentation, much of the terminology relating to these different media is transferable among the three. Therefore, although the video image 14 of FIG. 1 is an element of a digitized moving video presentation, it is convenient to discuss the video image 14 as though it were a "frame" of a photographically encoded moving picture presentation. Those skilled in the relevant art will readily understand the relationship between the digitized video image 14 and conceptually corresponding moving picture "frames". This method of reference is frequently used in the art, and the meaning of a "frame" of video will be recognized as corresponding to the single video image 14, although no actual physical embodiment of a frame may exist.

In the view of FIG. 2, it can be seen that an object 20 is depicted upon a background 22. The background 22, in this sense, is all of the video image 14 which is not the object 20 of concern. The background 22 may include nondescript and generally undefinable portions and, as in the example of FIG. 2, other item(s) 24, which other item(s) 24 are potentially definable portions of the background 22 that might, or might not, be separately defined as additional objects of interest.

Methods for identifying the object 20 within the video image 14 such that the computer 18 can perform some operation thereon, such as changing the color of the object 20 or deleting or moving it within the video image 14, or the like, are known in the art. In the best presently known embodiment 10 of the present invention, a well known and widely practiced edge detection technique known as Sobel's Algorithm (discussed in detail in *Digital Image Processing* by Gonzolez and Woods, Addison-Wesley Publishing, 1992, p. 197–201 and 416–420) is used to detect an edge 26 of the object 20. The edge 26 is, according to Gonzolez and Woods, a boundary between two regions of an image (the two regions being the object 20 and the background 22, in the present example of FIG. 2) which two regions have relatively distinct luminosity characteristics, although it is certainly conceivable that the edge 26 be defined according to color characteristics, or the like, in addition to or instead of by the luminosity characteristics.

A plurality (six, in the example of FIG. 2) of tags 28 are depicted in FIG. 2. The combination of one or more of the tag(s) 28 on the object 20 define a hot spot 30. That is, the hot spot 30 and the object 20 are perceptually, to an end user, essentially generally one and the same. As will be described in greater detail hereinafter, the tags 28 are defined regions of the display which, in turn, define the hot spots 30. While an originating user is engaged in establishing the position of the tags 28, the computer will draw the tags 28 on the display screen 16 such that the originating user can see where he or she has placed tags 28. However, since it is generally not desired that an end user see the tags, the present inventive method will simply not draw the tags 28 on a display screen 16a of an end user computer 18a, even though the locations which make up the tags are still defined and tracked as described herein. That is, the defining and tracking of the tags 28 according to the present inventive method are operation quite distinct from drawing their locations on the screen 16 and 16a. However, as defined herein, the object 20 is merely an area on the video image 14 which can be perceived as being a definable entity by a human observer, while the hot spot 30 is defined such that the computer 18 can recognize and track the hot spot 30, even as the hot spot 30 changes position and/or shape within the video image 14.

Figure 3:
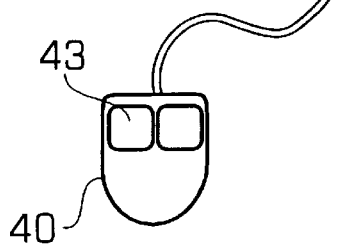
FIG. 3 is a detailed view of the an object of interest of FIG. 2, showing the relationship of the object to a hot spot.
Figure 3:
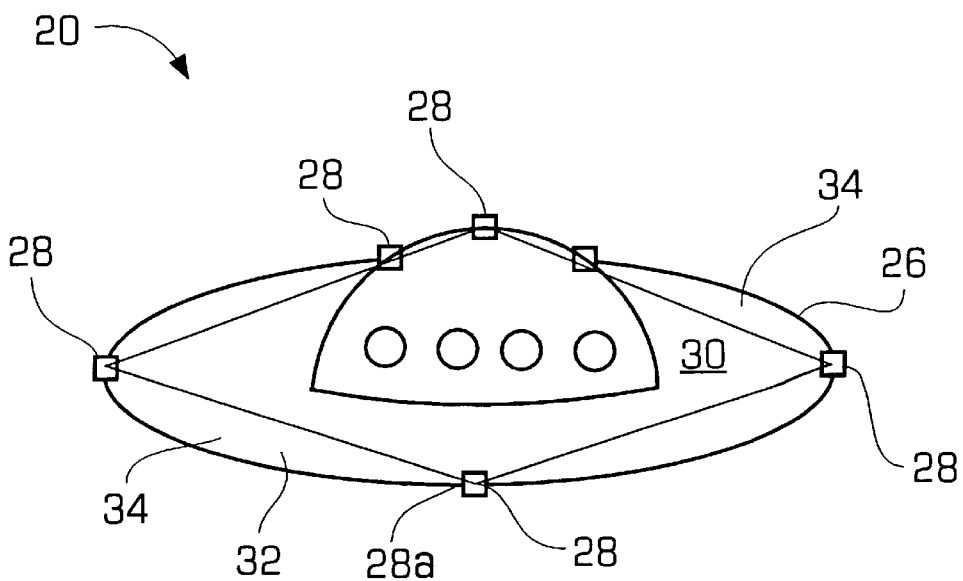

FIG. 3 is a more detailed diagrammatic view of the object 20 of FIG. 2. In the view of FIG. 3 it can be seen that the hot spot 30 is defined by the tags 28 such that a hot spot border 32 is established. It can be seen, then, that the hot spot 30 and the object 20 occupy generally, but not exactly, the same portion of the video image 14 {FIG. 1}. This will have no practical significance in the primary intended applications, since any undefined areas 34 which are within the object 20 confines and yet without the limits of the hot spot 30 will be at the outer limits of the object 20. An end user attempting to "click on" the object will naturally tend to click near the center of the object 20 and, therefore, also near the center of the hot spot 30. An end user will instinctively not expect a response from a click in the undefined areas 34 which lie near the edges of the object 20, even though the end user will not see nor have a way of knowing the exact locations of the hot spot border 32. As can be appreciated, the greater the quantity of properly distributed tags 28, the greater will be the correlation between the hot spot 30 and the object 20.

Figure 4:
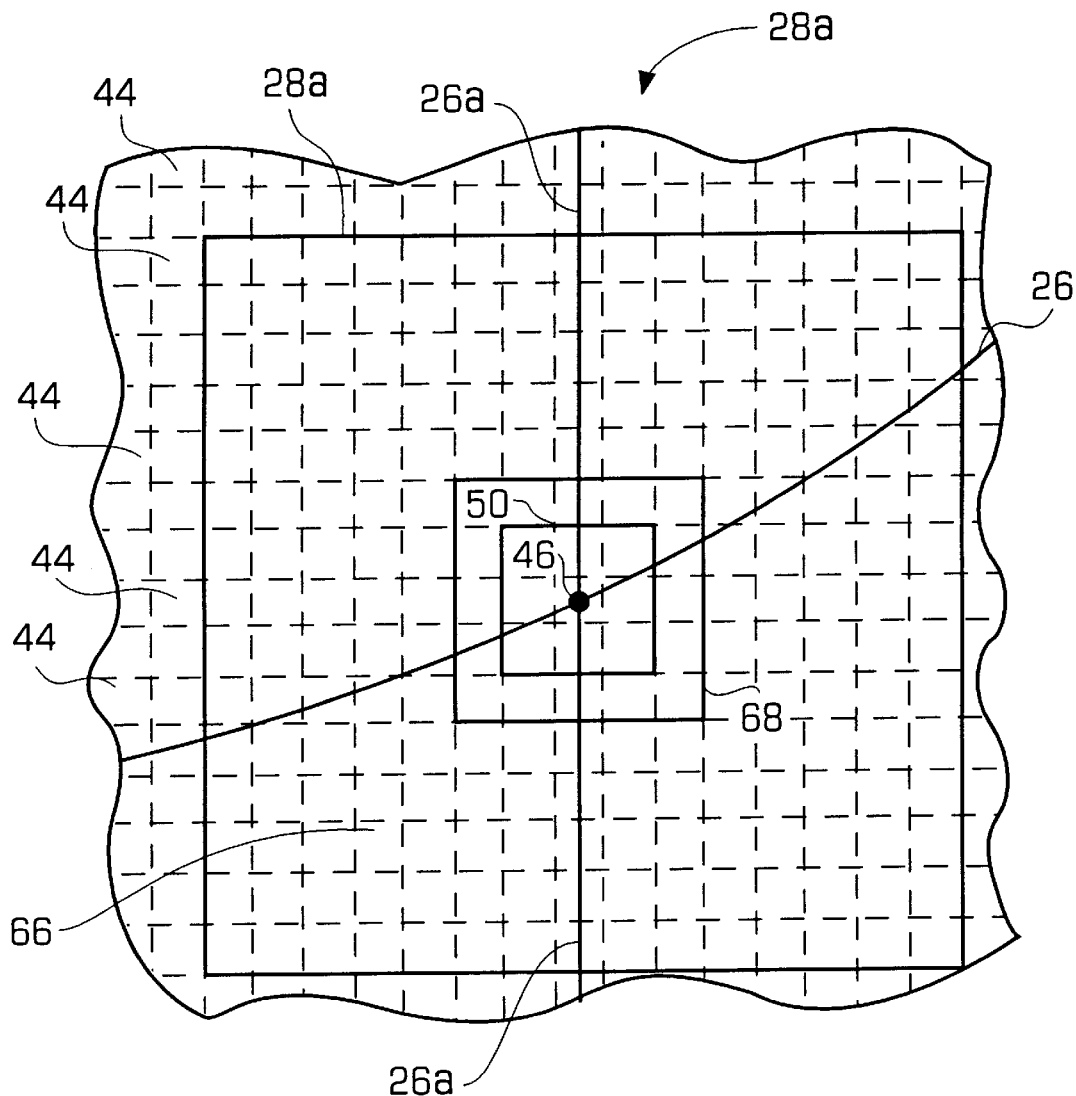
FIG. 4 is a detailed view of a hot spot defining tag according to the present invention.

FIG. 4 is a detailed diagram of a representative tag 28a of FIG. 2. The edge 26, as previously discussed herein, is defined according to principles and methods well understood in the art. In particular, in the example of the best presently known embodiment 10 of the present invention, the widely practiced Sobel's Algorithm is used to identify the edge 26. It should be noted that the process of edge identification will generally identify edges promiscuously, such that not only the edge 26 edge of the object 20, but also any other distinct edges {not specifically identified} which might exist in the video image 14 {FIG. 2} will be so identified.

Referring again to the flow chart of FIG. 1, it can be seen that the 'criteria choice' operation 12, as described herein in relation to the example of the best presently known embodiment 10 of the present invention, is the choice to use Sobel's Algorithm to detect edges (including the edge 26 of particular interest) according to luminance criteria. It may be, in some applications of the moving object identification method, that the 'criteria choice' operation 12 is fixed and unchanging for all uses of that application, such that the originating user will not accomplish the 'criteria choice' operation 12 each time the inventive moving object identification method 10 is accomplished.

Referring again to the flow diagram of FIG. 1, it can be seen that a 'tag objects' operation 36 is accomplished following the 'criteria choice' operation 12. As will be described in more detail hereinafter, in the best presently known embodiment 10 of the present invention, originating user intervention is required to accomplish the 'tag objects' operation 36, although it is within the scope of the present invention that some means or method might be developed in the future to essentially completely automate the 'tag objects' operation 36, or at least to further assist the originating user in order to minimize the need for user intervention.

Figures 5, 6:
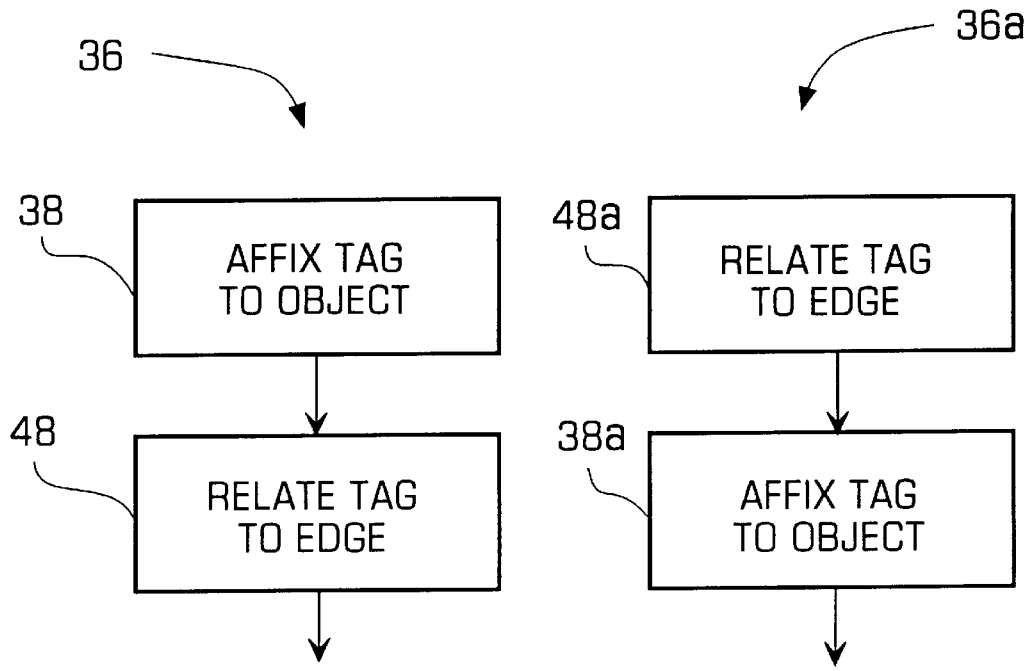
FIG. 5 is a more detailed flow diagram of the tag objects operation of FIG. 1.
FIG. 6 is a more detailed flow diagram showing an alternative sequence of substeps of the tag objects operation of FIG. 1.

In the best presently known embodiment 10 of the present invention, in the 'tag objects' operation 36 the user places the tags 28 around the borders of the object 26 of interest by clicking on the edge 26 of the object. FIG. 5 is a more detailed flow diagram of the 'tag objects' operation 36 of FIG. 1. In the view of FIG. 5, it can be seen that an 'affix tag to object' substep 38 precedes a 'relate tag to edge' substep 40. According to the best presently known embodiment 10 of the present invention, the originating user will "click on" the edge 26 of the object 20, as by using a mouse 40 {FIG. 1} to move a cursor 42 to the edge 26 whereafter the originating user will then depress a button 44 of the mouse 40. It should be remembered that the originating user, at this point in the process, will have to visually perceive the presence of the edge 26.

Referring again to the view of FIG. 4, a plurality of pixels 44 are identified. One skilled in the art will recognize that the display screen 16 has a plurality of the pixels 44 thereon, the exact quantity of which will be a function of the characteristics of the display screen 16 itself, as well as of the hardware and software controlling the video image 14. In order to conveniently describe the present inventive moving object identification method 10, the pixels 44 are illustrated on a grid such that the pixels 44 appear to be generally square, although one skilled in the art will recognize that actual physical pixels {not shown} may be round, rectangular, or other shape.

In the present example, if the originating user clicks on a selection point 46 (the selection point 46 being established when the originating user places the cursor 42 {FIG. 2} and depresses the mouse button 43), the tag 28a is placed with the center thereof being the selection point 46. In the example of FIG. 4, the tag 28a is 15×15 pixels 44 in size, the implications of which size will be discussed in more detail hereinafter.

Referring again to FIG. 5, the 'affix tag to object' operation 38 described above, is followed by a 'relate tag to edge' operation 48. According to the best presently known embodiment 10 of the present invention, in the 'relate tag to edge' operation 48, the edge 26 is automatically detected within the tag 28a, and an edge mask 50 is established on the edge 26 and at the center of the tag 28a. As previously discussed herein, for the purpose of illustrating the best presently known embodiment 10 of the present invention, Sobel's Algorithm was chosen as the means of edge detection in the 'criteria choice' operation 12 {FIG. 1 }. Those familiar with Sobel's Algorithm will note that a 3×3 mask is customarily used in that edge detection process, and so it is convenient, when using Sobel's Algorithm,, for the edge mask 50 to be three pixels 44 by three pixels 44 in size. It is also convenient to have the tag 28a be n by n pixels 44 in size where n is an integer greater than 1, as is illustrated by the 15×15 sized tag 28a of FIG. 4. Of course, a modified Sobel's Algorithm could be used such that the edge mask 50 would be of another size or, alternatively, an entirely different edge detection method might be employed whereby the edge mask 50 could be of essentially any size practical according to the other parameters of the present invention detailed herein.

It should be noted that, in the example of FIG. 4, as previously discussed herein, the originating user has precisely clicked on the edge 26 such that the selection point 46 falls on the edge 26. In actual practice, it might be that the originating user's estimation of the location of the edge 26 might be less than precise such that the initial location of the selection point 46 would not fall precisely on the edge 46. This situation is rather easily corrected, as follows: When the tag 28a is placed in the 'affix tag to object' substep 38 and, thereafter, the edge 26 is detected and the edge mask 50 is centered on the edge 26 in the 'relate tag to edge' substep 48, if the edge mask 50 is not centered in the tag 28a, then the tag 28a is automatically repositioned by the computer 18 such that the edge mask 50 is centered on the tag 28a. It is contemplated that alternative methods might be employed for dealing with situations wherein there is no portion of the edge 26 detected within the tag 28a. For example, the originating user could be advised of a "no edge detected" condition, and told to try again. Alternatively, the search for the edge could be expanded a predetermined number of pixels 40 beyond the tag 28a. If the edge 26 is detected in such an expanded search then the position of the edge mask 50 and the, tag 28a could be automatically adjusted accordingly. If, even after such an expanded search, the edge 26 is still not detected, then the originating user could be advised to repeat the 'affix tag to object' operation 38.

FIG. 6 is a flow diagram of an alternate 'tag objects' operation 36a which is not presently proposed as being the order of operations of the best presently known embodiment 10 of the present invention, but which, instead, illustrates a variant of the best presently known embodiment 10 which might be useful in some unforeseen circumstances. As can be seen from the flow diagram of FIG. 6, an alternate 'affix tag to object' substep 38a and an alternate 'relate tag to edge' substep 48a are reversed in order as compared to the correspondingly named substeps 38 and 48 of FIG. 5. This reversal of order requires some modification of the 'affix tag to object' substep 38 and the 'tag to edge' substep 48 which have been previously discussed herein.

As previously described herein, in the 'relate tag to edge' operation 48, edge detection (according to Sober's Algorithm in the present example) occurs generally within the tag 28a. In the alternative example of FIG. 6, upon completion of the 'criteria choice' operation 12, the edge detection process is run on the entire video image 14 {FIG. 1} such that the edge 26 (as well as any other edges within the video image 14 which are not specifically delineated herein) is highlighted so that the originating user then can see the edge 26. By comparison, in the previously described 'affix tag to object' operation 38, the originating user could estimate where the computer 18 might detect the edge 26, whereas in this present alternate example, at the outset of the alternate 'relate tag to edge' substep 48a and precise location of the edge 26, as determined by the computer 18, is made known to the originating user such that the originating user can place the tag 28a precisely on the edge 26. After the originating user places the tag 28a on the edge 26 in the alternate 'relate tag to edge' operation 48a, then it is a relatively simple matter for the computer 18 to center the tag 28a, in the alternate 'affix tag to object' substep 38a, such that the edge mask 50 (which, according to the alternate 'tag objects' operation 36a, will already coincide with a portion of the edge 26) is symmetrically arrayed about the edge mask 50. That is, the alternate tag objects operation 36a (FIG. 6) differs from the tag objects operation 36 (FIG. 5) in that, in the alternate tag objects operation 36a, the edge 26 is defined prior to the placing of the tag 28a. Whereas, in the first described tag objects operation 36, the edge 26 is established within the tag(s) 28.

Following the 'tag objects' operation 36 (or following the alternative 'tag objects' operation 36a, as discussed above) is a 'select region of interest' ("select ROI") operation 52. In the 'select ROI' operation 52, the originating user will merely click on the side of the edge 26 wherein is the object 20 to designate a region of interest ("ROI") 54, the ROI 54 being that portion of the video image 14 wherein the tag 28a and the object 20 coincide.

Following the 'select ROI' operation 52, the originating user is given a choice as to whether it is desired to place more tags 28 on the object 20 in a 'place more tags?' decision operation 56. If it is desired to place more tags 28, then the inventive process returns to the 'tag objects' operation 36. If the response to the 'place more tags?' decision operation 56 is no ("N"), then the process continues to a 'track objects' operation 28.

It should be noted that the operations of the inventive moving object identification method 10 which have been presented herebefore are accomplished on a single "frame" of the moving video image 14 {FIG. 2}. Beginning now a discussion of how the inventive procedure continues as the video image 14 changes through time, one skilled in the art will recognize that, in a digitized live action video production, the frame-to-frame attributes such as the size of the edge 26, color values of each of the pixels 44, luminosity characteristics, and the like, can each and all change due to various noise factors, changes in lighting, movements of the object 20 and other item(s) 24 (if present) in the video image 14 and/or movements of a camera (not shown) which originally captured the video image 14 in relation to the object 20, and the like.

Preliminary to discussing the tracking of the object 20 through time by means of the tags 28, it is anticipated by the inventor that certain parameters will be used for determining if the tags 28 continue to accurately represent the object 20 such that the hot spot 30 and the object 20 generally coincide. According to the anticipated best presently known embodiment 10 of the present invention, such parameters are: Luminosity, color and tag sensitivity.

Regarding luminosity, as part of the 'track objects' operation 58, the computer 18 will calculate the average luminosity within the tag 28 on either side of the edge 26. The originating user may specify an amount, expressed as a percentage of luminosity difference, by which this value can change before each respective tag 28 is flagged by the computer 18 as lost. (The fact and consequences of "tag lost" conditions will be discussed in greater detail hereinafter.)

Regarding color, the average value of the color of the pixels 44 within the ROI 54 is tracked by the computer 18 on a component-by-component (i.e. RGB) basis. The color parameter allows the originating user to specify the amount, expressed as a percentage, by which such average values can change before each respective tag 28 is flagged as lost.

Figure 7:
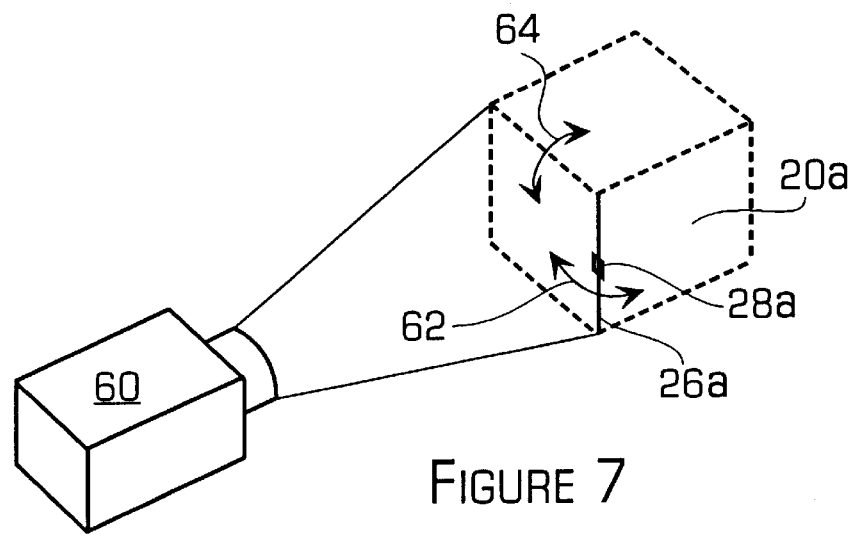
FIG. 7 is a diagrammatic representation showing the relationship of a simplified object to a camera.

Regarding tag sensitivity: This parameter addresses a phenomenon which is peculiar to the tracking of the three dimensional object 20 in two dimensional space (the video image 14), which describes the native environment of the inventive moving object identification method 10. FIG. 7 is a diagrammatic view illustrating a simplified (rectangular) object 20a shown in relation to a camera 60. A vertical edge 26a (chosen arbitrarily for purposes of this example only, since a horizontal edge {not specifically delineated} or other such edge could also be used to illustrate the point being made) is highlighted in the view of FIG. 7 for the purpose of this present discussion only. In relation to the view of FIG. 7, it can be seen that the simplified object 20a might rotate according to a first rotational arrow 62 such that the perceived length of the vertical edge 26a will remain generally constant as viewed from the camera 60. Alternatively, the simplified object 26a might rotate according to a second rotational arrow 64 such that the perceived length of the vertical edge 26a will vary according to the amount of rotation. Indeed, should the simplified object 20a rotate a full 90 degrees in either direction indicated by the second rotational arrow 64, the vertical edge 26a, as viewed from the perspective of the camera 60, will become essentially infinitesimally short. It can be appreciated that edges 26 which are not perfectly vertical or horizontal will experience this phenomenon in varying degrees depending upon the angle of such edge 26 relative to the camera 60 and further depending upon the actual direction of rotation of the object 20 {FIG. 2} as illustrated by the simplified object 20a {FIG. 7}. Also, it can be appreciated, in light of the above discussion, that movement of the camera 60 relative to the simplified object 20a will produce generally the same sort of relative lengthening and shortening of the edge 26 (as typified by the vertical edge 26a) as will movement of the simplified object 20a relative to the camera 60.

Referring now again to the view of FIG. 4, a sensitivity zone 66 is teat portion of the tag 28a which is not also within a subtag 68. In the example of FIG. 4, the subtag 68 is 5×5 pixels 44 in size. The subtag 68 is centered within the tag 28a. In practice, the subtag 68 might, or might not, be the same size as, and thus completely coincident with, the edge mask 50. The vertical edge 26a is depicted in the example of FIG. 4 as being horizontally centered within the representative tag 28a (as it will be according to either the 'tag objects' operation 36 or the alternative 'tag objects' operation 36a as previously discussed herein. As can be appreciated from the view of FIG. 7, as the simplified object 20a rotates as indicated by the second rotational arrow such that the vertical edge 26a moves away from the vertical, the apparent length of the vertical edge 26a from the perspective of the camera 60 will become increasingly shorter. When the vertical edge 26a becomes sufficiently short that it is within the subtag 68 but not within the sensitivity zone 66, then a tag lost condition will be indicated for that particular tag 28. As can be appreciated in light of the above discussion, the "sensitivity" for responding to this condition can be adjusted by adjusting the size of the sensitivity zone 66. That is, the larger is the subtag 68 in relation to the tag 28, then the smaller will be the sensitivity zone 66 and the quicker will a tag lost condition be indicated as loss of the edge 26 (as illustrated by the example of the vertical edge 26a) occurs. (It will be noted that, referring to the view of FIG. 7, the representative tag 28a is not actually superimposed on the simplified object 26a such that the representative tag will be visible thereon. Rather, the representative tag 28a is shown in the view of FIG. 7 simply for the purpose of denoting that portion of the vertical edge, 26a that is also shown in the view of FIG. 4.)

Figure 8:
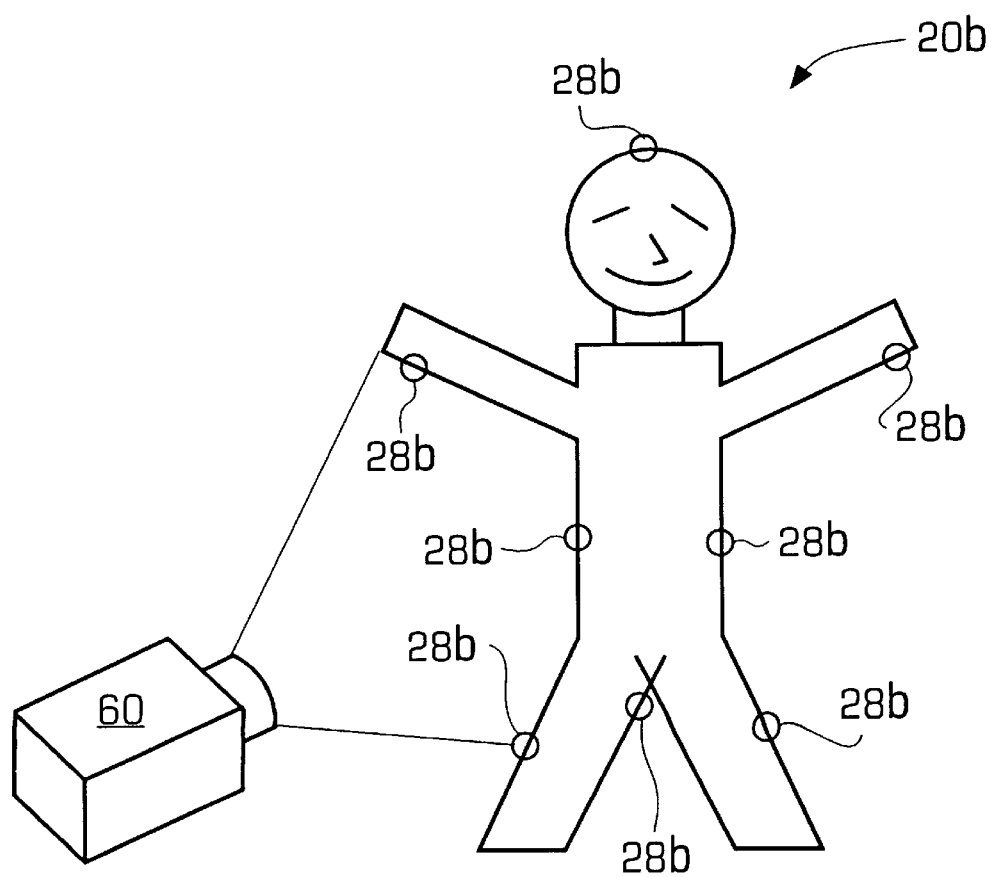
FIG. 8. illustrates an alternative embodiment for identifying a physical moving object using physical tags.

FIG. 8 illustrates an equally preferred alternate embodiment of the inventive moving object identification method. In the view of FIG. 8, it can be seen that a complex object 20b has distributed thereon a plurality of physical tags 28b. The physical tags 28b are transponders which are capable of relaying their relative position to the camera 60 such that such relative position(s) can be recorded along with the video image 14 {FIG. 2} thereof. Such transponders as constitute the physical tags are now commonly available. These operate according to any of several technologies, including radio triangulation and ultrasonic triangulation principles. For example, an ultrasonic system which is capable of very precise location information in three dimensions, as well as attitudinal information (roll, pitch and yaw) of the physical tags 28b, while not creating audible noise and while being generally impervious to interference from ambient noises, is marketed as a developers kit by Logitech™. It should be noted that it is known in the field to attach a single sensor to objects (such as people) for recording the position of such objects relative to a camera during the making of a motion picture. However such objects as previously known and used are not sufficiently sensitive, nor do they need to be when used for the purposes for which they have been employed in the prior art, to distinguish the limits of such objects.

When the physical tags 28b are implemented as illustrated in FIG. 8, it is a simple matter to transfer the recorded location of the physical tags into software such that the computer 18 will be able to define the object(s) 20 according to (software) tags 28, as described herein. After the locations of the physical tags 28b are transferred from the original recording media such that the computer 18 will have a record of such locations for the video image 14, then the location of the physical tags 28b is not significantly different from the location of the tags 28 that were originally created in software as previously discussed herein.

It should be noted that, whether the (software) tags 28 or the physical tags 28a are initially used, there will occur some general conditions not specifically addressed previously herein. For example, it will often occur that as the object(s) 20 rotate or move within the video image 14 that the edges 26 will appear to cross over when viewed from the two dimensional perspective. (That is, for example, when an object 20 turns completely around such that the right becomes the left and the left becomes the right as viewed from a stationary perspective, then the edges will appear to cross over at some point in between.) Actually such variables pose little or no problem in relation to the present inventive moving object identification method 10. Where a tag 28 crosses over the hot spot border 32 such that the tag 28 is inside the hot spot border 32, it can simply be temporarily ignored until it again crosses over the existing hot spot border 32 and emerges from within the hot spot 30. One skilled in the art will recognize that, since the hot spot 30 is defined as the area bound by the tags 28, and since the hot spot 30 need only generally or roughly correspond to the outline of the object 20, then the computer 18 can be programmed to define the hot spot 30 as the largest shape that can be defined by the tags 28. Thus, it may be that some of the tags 28 might temporarily fall within the bounds of the hot spot 30 and will, thus, not be a part of the border of the hot spot 30. That is, such tags 28 will, temporarily, be ignored. Nevertheless, such tags 28 will continue to be tracked and will again constitute a part of the boundary of the hot spot 30 if and when they emerge from within the boundaries of the existing hot spot 30 (that is, when the hot spot 30 will be larger by including the tag 28 in question in the boundary than it would be without including the tag 28 in question in the boundary).

Figure 9:
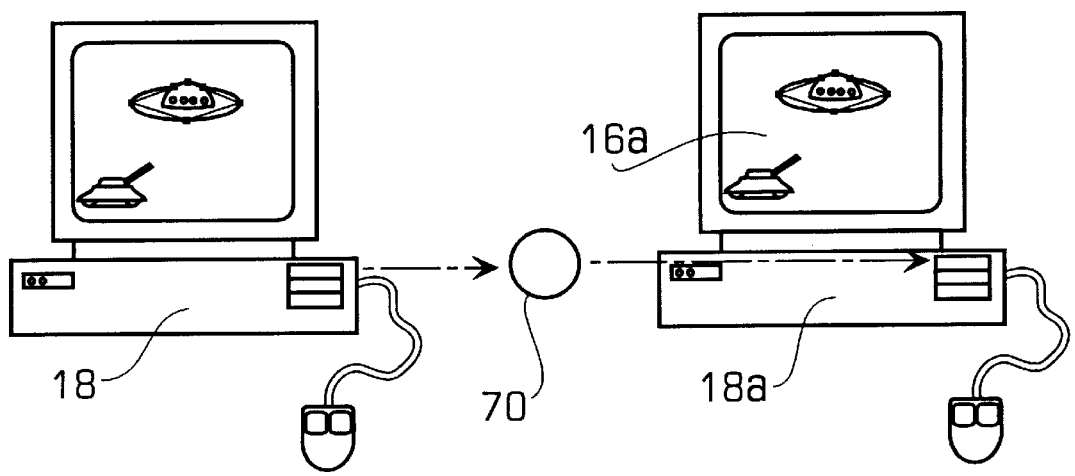
FIG. 9. illustrates the relationship between a computer used for performing the invention, a computer/user interface, and an end user computer.

FIG. 9 illustrates the relationship of the computer 18 which is used to assist in performing the present inventive method to an end user computer 18a upon which an end product such as an interactive computer/user interface 70 will be used. The interactive computer/user interface 70 is shown in the view of FIG. 9 embodied in a CD ROM. Of course, the interactive computer/user interface 70 will generally only constitute a relatively small portion of the content of a typical CD ROM in which it might be included.

Having been produced on the computer 28, the interactive computer/user interface 70 will be incorporated into the CD ROM (or, alternatively, into a floppy disk or other means of communicating to the end user computer 18a. Then that CD ROM will generally be copied and that CD ROM (or, more generally, a copy thereof) will be transferred to the end user computer 18a where the interactive computer/user interface 70 will be introduced thereinto and then displayed upon an end user display screen 16a of the end user computer 18a.

Returning again to a consideration of the "tag lost" condition referenced several times previously herein, it will be noted that a single lost tag 28 will generally not be fatal to the continuation of the inventive moving object identification method 10. As noted herein, the location of the tags 28 for defining the hot spots 30 is associated with the video image 14 by the originating user according to the present inventive moving object identification method 10, with the aid of the computer 18. As previously discussed herein, the originating user, will be able to see the tags 28 and the hot spot borders 32, where the end user will not and will, therefore, generally not be able to distinguish between the object 20 and the corresponding hot spot 30. The tag 28 can become "lost" when an edge 26 is foreshortened, when the tag 28 moves so quickly that it is cannot be followed according to the present inventive method as presently embodied, or when "noise" of one sort or another masks the tag 28. When the originating user is advised of a tag lost condition, the originating user will be able to make an assessment as to whether or not there remains sufficient correlation between the hot spot 30 and the object 20. Should these still be appear to be essentially the same, then the 'track objects' operation 58 will be allowed to continue tracking the object 20 and storing associated locations of the tags 28 therefor. Should a determination be made that there is no longer sufficient correlation between the hot spot 30 and the object 20, then the originating user can restart the inventive moving object identification method 10 beginning at the chronological point in the run time of the video image 14 wherein it is determined that such is required.

It should be noted that modifications to the present inventive method are contemplated which will minimize the computational time required in tracking the tags 28 in the computer 18 of the originating user. Of course, this will not be a consideration regarding the end user computer 18a, since the location of the tags 28 has been recorded by the originating computer 18 and the end user computer 18a will simply note that proper location of the tags 28 relative to the video image 14. However, during the actual accomplishment of the moving object identification method 10, there can be a significant amount of time involved in the track objects operation 58, which operation is performed by the computer 18. In order to minimize the amount of computational time required to track the tags 28, the following methods have been found to be of practical value: It is often convenient to assume that a tag 28 has not been moved from its previous location. This assumption can be quickly checked and, if it is valid, then the time expended in recomputing a tag 28 location is saved. When the previous assumption proves to be incorrect, it is further convenient to assume that a previous direction of movement remains constant. Therefore, the computer 18 can try placing the tag 28 in a location determined by the previous direction and amount of displacement of that tag 28, thereby avoiding having to move the edge mask 50 over a larger area in search of the edge 26. The previous amount and displacement of the tag 28 are determined by the direction and amount of displacement of the tag 28 between the immediately previous two frames. Of course, should all such assumptions prove to be incorrect, the computer 18 will have to expand its area of search or else report a tag lost condition as previously discussed herein. It is expected that these and other refinements of the present inventive moving object identification method 10 will be developed and improved as the inventive method is implemented and adapted to various applications.

Various modifications may be made to the invention without altering its value or scope. For example, although the best presently known embodiment 10 of the present inventive method uses edge identification to originally define the object 28 as an aid to placing the software tags 28, means such as color identification could be equally well applied.

Another likely modification would be to further automate the location of the tags 28. For example, where the 'alternative tag objects' operation 36a is employed such that the edge 26 is identified before the tag 28 is placed, software might be written wherein the originating user could merely click within the object and a plurality of rays could be generated from the location thus selected outward with the intersection of the rays and the edge 26 being marked as tags 28. Further refinements on this method might allow the originating user to select from among the tags 28 thus created.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The inventive moving object identification method 10 is intended to be widely used in the multimedia industry. The predominant current usages are for the identification and tracking of objects within a moving video image such that the objects can be used as though the object were a graphical icon or a similar means for interaction between an end user and a computer.

In practice, the inventive moving object identification method 10 will be incorporated into many more extensive methods wherein the identification of moving objects 20 within a video image 14 is a necessary or desirable means for interacting with the product of such more extensive method. A principal example will be in the production of the interactive computer/user interface wherein the end user may click on the object 20 to access further information or initiate some other action. For instance, where further information is available about such object 20 the end user can access the further information by clicking on the object.

According to the present inventive method, there can be hot spots 30 within hot spots 30 on a given screen and/or clicking upon one hot spot can bring up another screen or a partial screen which subsequent screen(s) also contain other hot spots. Thereby, the degree of interactivity of a program or interface is greatly enhanced over the prior art. There can be hot spots 30 within hot spots 30 simply because, as described herein, each of the hot spots 30 is separately defined by a set of tags 28 and there is simply no reason why there cannot be hot spots 30 within hot spots 30. One skilled in the art will recognize that it is known in the art to initiate an action of the computer by clicking on a defined area of the screen (such as is done with an icon or the like). When an area of the screen is defined by a hot spot 30, the same technology can be applied. When such defined action is to bring up another screen, the other screen can be programmed to contain hot spots 30 in like manner to that described herein in relation to the example of the best presently known embodiment of the present inventive method.

Since the moving object identification method 10 of the present invention may be readily integrated into existing and future end product creation methods, it is expected that it will be acceptable in the industry as a new and useful tool available to those engaged in the creation of computer software and software/hardware combination products. For these and other reasons, it is expected that the utility and industrial applicability of the invention will be both significant in scope and long-lasting in duration.

NOTICE: This parts list is provided for informational purposes only. It is not a part of the official Patent Application.

PARTS LIST

10 MOVING OBJECT IDENTIFICATION METHOD
12 CRITERIA CHOICE OPERATION
14 VIDEO IMAGE
16 DISPLAY SCREEN
16a END USER DISPLAY SCREEN
18 COMPUTER
18a END USER COMPUTER
20 OBJECT
20a SIMPLIFIED OBJECT
20b COMPLEX OBJECT
22 BACKGROUND
24 ITEMS
26 EDGE
26a VERTICAL EDGE
28 TAGS
28a REPRESENTATIVE TAG
28b PHYSICAL TAG
30 HOT SPOT
32 HOT SPOT BORDER
34 UNDEFINED AREAS (OF THE OBJECT 20)
36 TAG OBJECTS OPERATION
36a ALTERNATIVE TAG OBJECTS OPERATION
38 AFFIX TAG TO OBJECT
40 MOUSE
42 CURSOR
43 MOUSE BUTTON
44 PIXELS
46 SELECTION POINT
48 RELATE TAG TO EDGE OPERATION
50 EDGE MASK
52 SELECT ROI OPERATION
54 ROI
56 PLACE MORE TAGS? DECISION OPERATION
58 TRACK OBJECTS OPERATION
60 CAMERA
62 FIRST ROTATIONAL ARROW
64 SECOND ROTATIONAL ARROW
66 SENSITIVITY ZONE
68 Interactive computer/user interface

What is claimed is:

1. A method of identifying an object in a digitized moving video image such that the object can be acted on by a computer, comprising placing a plurality of tags at user selected points on the object in a video frame, each tag containing an edge of the object and the plurality of tags generally defining the object; automatically detecting the edges of the object; relating each tag to an edge by repositioning the tag to center the tag on the edge; tracking the object in subsequent frames of the moving video image by determining the locations of said tags in said subsequent video frames, wherein said plurality of tags define an area of the object corresponding to a hot spot, and said tracking of the object comprises tracking the hot spot, and wherein said hot spot comprises an area of the object bounded by lines interconnecting said plurality of tags.

2. A method of identifying an object in a digitized moving video image such that the object can be acted on by a computer, comprising placing a plurality of tags at user selected points on the object in a video frame, each tag containing an edge of the object and the plurality of tags generally defining the object; automatically detecting the edges of the object; relating each tag to an edge by repositioning the tag to center the tag on the edge; tracking the object in subsequent frames of the moving video image by determining the locations of said tags in said subsequent video frames, wherein a tag comprises a first two dimensional array of pixels within a video frame, and each tag contains a subtag comprising a second smaller two-dimensional array of pixels centered within the first array; and wherein said re-positioning of the tag to center the tag on an edge comprises positioning the subtag on the edge.

3. The method of claim 2 further comprising defining a sensitivity zone comprising the portion of a tag not included within the subtag.

4. The method of claim 3, wherein said automatically detecting an edge of the object comprises applying an edge mask to the video image, and determining an edge by detecting changes in luminance.

5. The method of claim 4, wherein said edge mask comprises a third array of pixels, and said detecting changes in luminance comprises detecting luminance differences within the third array which exceed a predetermined threshold.

6. The method of claim 2 further comprising ceasing to track a tag; in the moving video and recording the tag as being lost when an edge of the object within the tag becomes sufficiently short to be within the subtag but not within the first array of pixels which contain the subtag.

7. A method for identifying and tracking an object in a moving video image such that the object can be acted on by a computer, comprising placing a tag at a user-selected point on the object within a video frame, the tag comprising an array of pixels and said placing comprising selecting a point for the tag such that the tag contains an edge of the object; repositioning the tag such that the array of pixels comprising the tag is centered on the edge; selecting a region of interest within the tag corresponding to a portion of the tag which coincides with the object; repeating said placing and selecting steps to place a plurality of tags on the object; defining a hot spot comprising an area bounded by lines interconnecting the tags, the hot spot comprising a clickable area which enables the object to be acted upon by the computer; and tracking the object over successive frames by tracking and storing the locations of each of the tags from frame to frame.

8. The method of claim 7, wherein said tracking comprises determining the average luminosity within a tag within the region of interest and within an area outside of the region of interest and determining a luminosity difference, and identifying a tag to be lost when the luminosity difference decreases below a predetermined value.

9. The method of claim 7, wherein said tracking comprises determining average values for color components of pixels within the region of interest of a tag, and tracking the tag until the averages values change by a predetermined amount.

10. The method of claim 9, wherein said tracking comprises defining a subtag within tag comprising a smaller array of pixels centered within the tag and containing said edge; and considering the tag to be lost when the size of the edge changes due to motion of the object such that the edge is located within the subtag but not within the area of the tag not constituted by the subtag.

\* \* \* \* \*